Jan. 19, 1960  A. M. A. MAILLET  2,922,078
ELECTRIC CIRCUITS FOR WORKING AND SHAPING
MATERIALS BY SPARK EROSION
Filed Aug. 7, 1958                            2 Sheets-Sheet 1
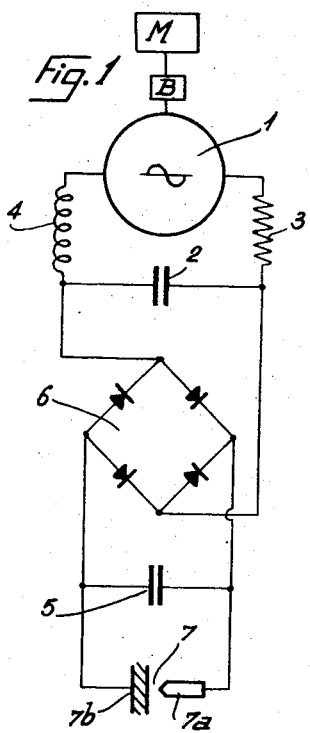
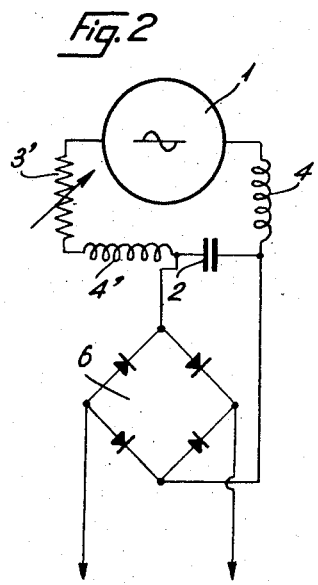
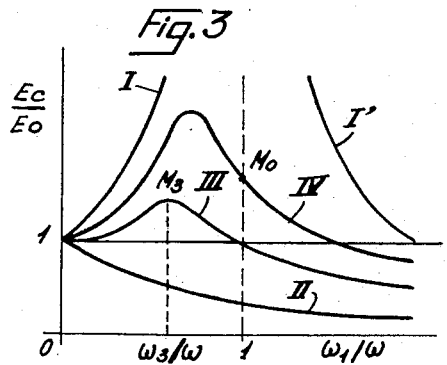
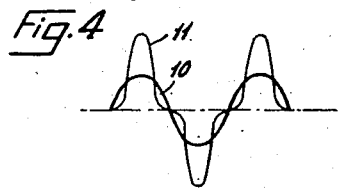
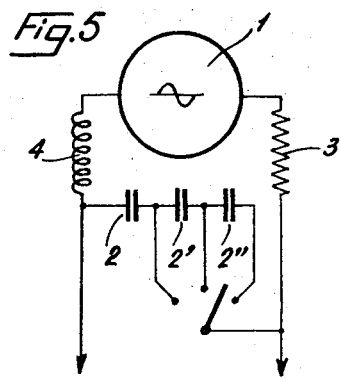
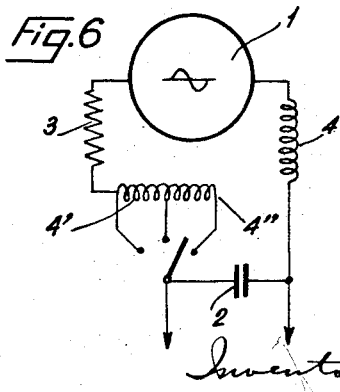
Inventor
Alfred M. A. Maillet
By Robert Henderson
Attorney

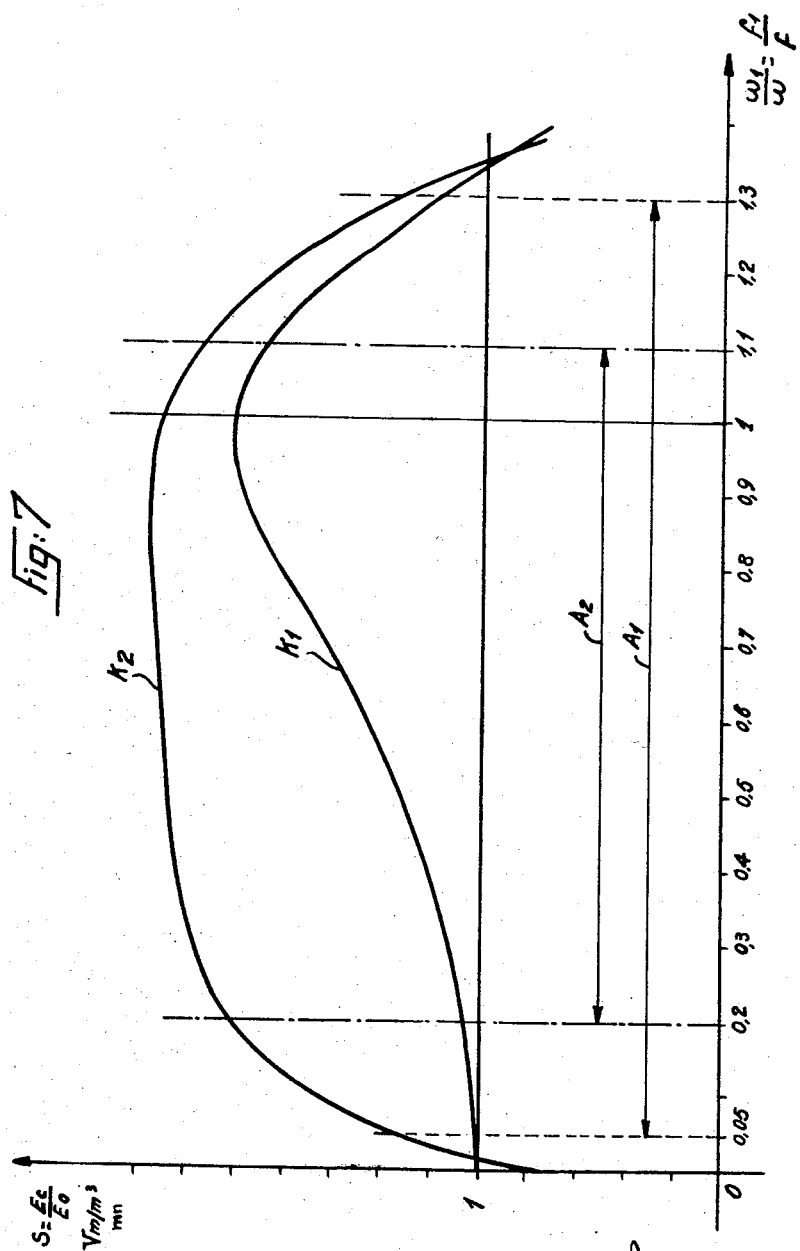

United States Patent Office 2,922,078
Patented Jan. 19, 1960

2,922,078

ELECTRIC CIRCUITS FOR WORKING AND SHAPING MATERIALS BY SPARK EROSION

Alfred M. A. Maillet, Versailles, France, assignor to La Soudure Electrique Languepin, Paris, France, a company of France Application August 7, 1958, Serial No. 753,657

Claims priority, application France August 7, 1957

5 Claims. (Cl. 315—163)

It is well known that apparatus for working by spark erosion comprises an electric energy-storing device which is generally capacitive, and which, when charged from a source of current, is periodically discharged in the form of sparks in the space between a machining electrode and the piece to be machined.

In order to reduce wear of the electrode to a minimum the latter is generally maintained at a positive potential by a suitable polarisation of the charging circuit. To this end, there may be employed a source of direct current, which may be pulsating, or preferably an alternating current source combined with a rectifier device.

In all cases however, it is desirable to prevent the striking of a destructive arc supplied by the source, after the passage of a spark between the piece and the electrode.

For this latter purpose, it is desirable that the intensity of the current supplied from the source should be reduced at least immediately after the striking of the spark.

Finally, the elementary crater produced in the piece by every spark being a direct function of the energy which is contained in the storage device, at the moment when the spark is produced, an increase in the speed of machining, that is to say of the material removed from the piece per unit of time, can only result from an increase in the speed of recharging of this device in order to ensure a frequency of recurrence of the sparks which is as high as possible.

The present invention has for its object improvements in electric circuits for machining by spark erosion, the effectiveness of which has been shown by experience to be considerably improved.

In accordance with the invention, in a circuit for machining by spark erosion comprising an alternating source feeding into a storage device through the medium of a rectifier device, the self-inductance of the portion of the circuit which comprises the source, and the extremities of which terminate at the rectifier device being defined numerically, this portion of the circuit is shunted by a capacity which is substantially tuned to the frequency of the source with the self-inductance of the said circuit.

In other words, if $\omega = 2\pi f$ represents the frequency of the source, and L is the self inductance of the circuit, the value of the capacity is chosen so as to satisfy the relation $$\omega L = \frac{1}{\omega C}$$

As may be foreseen theoretically, the over-voltage obtained at the terminals of the rectifier is a maximum for the exact tuning of the capacity to the frequency of the source, taking account of the inductance of the portion of the circuit shunted by this condenser.

However, for values situated on each side of this precise value of the capacity, an over-voltage of smaller magnitude appears at the terminals of the rectifier.

Now, the applicant has found that there was no proportionality between the over-voltage obtained and the speed of machining, and that in particular, over-voltages, even of small value, obtained with capacities very much less than those which correspond to the exact value for tuning, had the effect of considerably increasing the machining speed although they provided only a small over-voltage.

Thus the applicant has found by experiment that, as compared with the exact conditions of tuning, the ratio of the frequency of the source to the tuning frequency could vary between one-twentieth of this latter frequency and 1.3 times the value of that frequency, whilst maintaining a machining speed very substantially greater than that which can be obtained with the known types of circuit.

In view of the fact that the values of the tuning capacities vary as the square of the frequencies, in accordance with the present invention, the value of the capacity connected in shunt can be comprised between 1/400 and 1.7 times the value of the capacity corresponding to exact tuning, taking account of the frequency of the source and of the self-inductance of the portion of the circuit containing that source, which terminates at the input terminals of the rectifier.

The self-inductance of the said circuit is preferably reduced to the internal inductance of the source. In addition, the latter is preferably electro-magnetic, that is to say it comprises a fixed or moving ferro-magnetic inductor. In particular, the said source is preferably an alternator.

In accordance with a further special feature of the invention, the self-inductance of the portion of the circuit containing the source is limited to a value which does not exceed 2.5 millihenrys.

This alternator may be of fixed frequency, in which case the capacity is determined once and for all, or it may be of variable frequency, in which case the capacity is adjusted for each of the working frequencies.

Since in spark-working circuits the electric phenomena are discontinuous to a certain degree in the sense that they are of a 'transient" nature it is difficult to make a theoretical analysis of the effect of including the capacitance Cs. It seems, however, that the following explanation may be given for its favourable influence.

(a) The presence of the capacitance Cs unquestionably creates a surtension (which is moreover measurable) at the source terminals which, when applied to the rectifier, will accelerate the charging of the storage device. Through the selection of the surtension created in this way an optimum charging tension at the said storage device may be achieved whle using charging sources of comparatively low voltage.

(b) The resonance of the tuned circuit section acts on the basic frequency of the source and not on its harmonics, especially its odd harmonics which are always present in the alternating current induced by near-saturation magnetic circuits. Accordingly, the amplitude of the basic-frequency voltage is accentuated while, with the reduction in the amplitudes of the odd harmonics, the voltage for charging the storage device assumes a more pronounced pulsating character.

(c) At the instant of sparking, the self-inductance and the capacitance of the tuned circuit section are in some way short-circuited across the rectifier by means of the spark gap with the result that the said capacitance and/or the said self-inductance are allowed to discharge at least partially. Thus, when the spark is extinguished, the source must begin by recharging its own self-inductance and the capacitance by which it is shunted before being able to supply current to the storage device and the spark gap. This may explain why an arc is not set up in the spark gap after the striking of a spark, in spite of the absence in the circuit of additional impedances which are usually included for the purpose of current limitation.

In particular, with a self-inductance less than 2.5 millihenrys, the said self-inductance is prevented from constituting an electric energy fly-wheel liable to prolong the duration of the spark by its own discharge, and in consequence to convert this spark into a destructive arc.

The description which follows below with reference to the accompanying drawings (which are given by way of example only and not in any sense by way of limitation) will make it quite clear how the invention may be carried into effect, the special features which are brought out either in the drawings or in the text, being understood to form a part of the said invention.

Fig. 1 is a diagram of a circuit for machining by sparks in accordance with the invention.

Fig. 2 is an alternative form of the circuit of Fig. 1.

Fig. 3 shows the variations of the voltage at the terminals of the capacity which shunts the source, at different frequencies and for different values of the ohmic resistance of the circuit.

Fig. 4 shows the effect of this capacity on the form of the curve which represents the supply current.

Figs. 5 and 6 show further alternative forms of the circuits shown in Figs. 1 and 2.

Fig. 7 is a curve enabling a comparison to be made between the over-voltages obtained and the machining speed.

Referring now to Fig. 1, the supply circuit comprises an alternator 1 driven by a motor M, with an interposed speed-changing device B, thus assuring the supply of alternating current at frequencies variable at will. The alternator is shunted by a capacitance 2. The reference numbers 3 and 4 represent the ohmic resistance and the self-inductance of the section of the charging circuit terminating at the rectifier network 6. The self-inductance 4 may, according to the requirements of each case, be reduced to the mere internal self-inductance of the alternator 1 and its connections (Fig. 1) or comprise an additional external self-inductance 4' as in a modification of this embodiment shown Fig. 2; similarly the resistance 3 may comprise an additional external resistance, preferably adjustable.

In Fig. 1, the storage device is a capacitor 5 connected to the output terminals of rectifier network 6 which latter comprises a full-wave bridge rectifier circuit. Each time the tension at the terminals of capacitor 5 attains a value corresponding to the disruptive tension of the spark gap 7 separating the electrode $7a$ and the work-piece $7b$, capacitor 5 is discharged into the said gap.

The value C of the capacitor 2 is such that the said capacitor forms with the self inductance L a circuit which is tuned for the frequency $f$ of the alternator 1. In other words $\omega L - 1/\omega C = 0$.

When this condition is exactly fulfilled, the current 20 in the circuit 1, 2, 3, 4 under these conditions is limited only by the value R of the circuit resistance and, in calling the source voltage $E_0$, the voltage $E_c$ at the terminals of the capacitor 2 has a value $$E_c = \frac{E_0}{R}\omega L$$

Particularly, if R is very small the voltage applied to the rectifier terminals is quite large. If the alternator 1 supplies current at a frequency $$f_1 = \frac{\omega_1}{2\pi}$$

being different from $f$, the voltage $E_c$ at the terminals of the said capacitor varies as indicated in Fig. 3. In this figure the relation $\omega_1/\omega = f_1/f$ has been entered on abscissae and the relation $E_c/E_0$ on ordinates; each of the plotted characteristics corresponds with a different value of the circuit resistance R. The characteristic I—I' corresponds with the ideal case of the resistance being nil;

it forms assymptotes relatively to a straight line which is perpendicular to the abscissa 1 ($\omega_1/\omega = 1$, or $\omega_1 = \omega$). The characteristic II corresponds with the case in which $$R_0 = 2\sqrt{\frac{L}{C}} \text{ (critical resistance)}$$

it starts from the ordinate point 1 ($E_c = E_0$) on the ordinate axis ($\omega_1 = 0$) and then drops constantly as $\omega_1$ grows. The intermediate characteristics such as III and IV correspond with intermediate R values between $R_0$ and zero. Every one of these curves has a peak whose value at the terminals of C is:

$$E_{c\text{ (max.)}} = \frac{E_0}{2R/R_0\sqrt{1-(R/R_0)^2}} \approx \frac{E_0}{2}\frac{R_0}{R}$$

The coefficient of sur-tension in this circuit is defined by the quotient:

$$S = E_{c\text{ (max.)}}/E_0 \approx \frac{1}{2}\frac{R_0}{R}$$

If due regard is paid to the shape of the characteristics in Fig. 3 (or to that of other intermediate characteristics between I and II) it will be possible to select a frequency $f$ for which the proportion $\omega L = 1/\omega C$ is complied with while acceptable values for the factor S remain available for other operational frequencies. In order to pass from one to the other of the said characteristics, i.e. to shift the point and change the ordinate of its peak, in the vicinity of one and the same frequency $f$, it may be of interest to use a small auxiliary regulatable resistance such as designated by 3' in Fig. 2.

Thus a comparison of the ordinates for the points $M_0$ and $M_3$ in Fig. 3 shows that it is possible to obtain more or less the same value of the sur-tension coefficient S for the different frequencies $f$ and $f_3$, owing to two different values of the circuit resistance R.

However, without varying the resistance of the circuit by moving the working point along the same curve III for example of Fig. 3, it can be shown that the machining speed does not vary proportionally with the value of the over-voltage.

In Fig. 7, as in Fig. 3, there has been plotted as abscissae the ratio $$\frac{\omega_1}{\omega} = \frac{f_1}{f}$$

that is to say the ratio of the true frequency $\omega_1$ of the alternating source employed and the tuning frequency $\omega$, that is to say, if L is the self-inductance of the alternating circuit, C is the capacity of the condenser 2, the frequency $\omega$ which satisfies the relation $$\omega L = \frac{1}{\omega C}$$

As ordinates, there is plotted the coefficient of overvoltage S, that is to say the ratio $E_c/E_0$ of the maximum voltage $E_c$ at the terminals of the condenser with the voltage $E_0$ of the source.

In this case the over-voltage is given by the curve K similar to the curve III of Fig. 1 (the internal resistance of the circuit and the storage capacity remaining constant).

The over-voltage obtained is zero when $\omega_1 = 0$ (direct current), first of all it increases slowly and then rapidly up to the maximum obtained when $$\omega_1 = \omega \left(\frac{\omega_1}{\omega} = 1\right)$$

and then decreases in such manner that the ratio $E_c/E_0$ becomes less than 1 for a value of $\omega_1/\omega$ equal to about 1.35.

However, if for these decreasing values of $\omega_1/\omega$, the machining speeds are plotted at the same time (in cubic mm. of metal removed from the piece to be machined, per minute), there is obtained the curve $K_2$ which increases much more rapidly than the curve $K_1$, then passes to a maximum which is almost flat and thereafter decreases.

The shape of the curve $K_2$ is thus very different from that of the curve $K_1$ for values of $\omega_1/\omega$ which becomes closer to 1 by increasing values.

The surprising result thus emerges that even for values of $\omega_1/\omega$ which only give a very small overvoltage, the machining speed is very considerably increased.

For values of $\omega_1/\omega$ comprised between 0.05 and 1.3 (distance $A_1$), the machining speed is in practice approximately doubled, and for values comprised between 0.3 and 1.1 (distance $A_2$), this speed is substantially trebled with respect to the speed obtained without the condenser 2 in shunt across the input terminals of the rectifier 6.

In order to draw the curves shown in Fig. 7, the electrical characteristics of the circuit can be kept constant and the frequency $\omega_1$ of the source can be varied, that is to say in practice the speed of the supply alternator.

In practice, it is preferable to keep constant the speed of the alternator ($\omega_1$ and L being constant) and to vary the value of the shunt condenser C by calculating the pulsation $\omega$ which corresponds to this condenser to obtain the tuned condition of the circuit.

The value of $\omega$ corresponding to tuning is given by $$\omega = \frac{1}{\sqrt{LC}} \qquad (1)$$

and the ratio $\omega_1/\omega$ is given by $$\frac{\omega_1}{\omega} = 2\pi f_1 \sqrt{LC}$$

where $f_1$ is the constant frequency of the alternator.

The frequency $\omega$ thus calculated is bound up in accordance with the Formula 1 with the value C of the capacity by the relation $$C = \frac{1}{\omega^2 L}$$

In other words, the value of the capacity varies as the inverse square of the pulsation $\omega$, calculated by means of the Formula 1.

The result is that in practice the values of capacities which can be used to give an effective improvement in the speeds of machining correspond to the square of the value of the ratios $\omega_1/\omega$ between which this improvement is obtained.

So that as compared with the value C of the capacity connected in shunt which corresponds to exact tuning, the values of $C_1/C$ comprised between $(1/20)^2 = 1/400$ and $(1.3)^2 = 1.7$ double the machining speed, whilst the values comprised between $(0.3)^2 \approx 0.1$ and $(1.1)^2 = 1.2$ substantially treble it.

The following numerical example will enable the advantages resulting from the present invention to be appreciated.

An alternator 1 was used having a constant frequency of 2,500 cycles.

The internal self-inductance of this alternator (only the self-inductance of the circuit through which alternating current passes) was 0.6 millihenry and the internal resistance was 3.5 ohms.

The storage device 5 had a capacity of 40 microfarads. Different values of the capacity 2 connected in shunt across the input terminals of the rectifier 6 were employed. The results obtained are shown in the following table.

| Value of capacity (2) in mfd | 0 | 0.25 | 2.75 | 7.5 | 10.2 | 11.5 | 12.5 |
|---|---|---|---|---|---|---|---|
| $E_c/E_0$ | 1 | 1.08 | 1.5 | 2 | 1.54 | 1.18 | 0.94 |
| $\omega_1/\omega$ | 0 | 0.19 | 0.63 | 1 | 1.21 | 1.28 | 1.34 |
| Machining speed in cu. mm. per min | 380 | 1,005 | 1,131 | 1,150 | 885 | 696 | 502 |

It will be observed that in this example, the self-inductance was limited to 1.6 millihenrys. Generally speaking, this self-inductance should be not be greater than 2.5 millihenrys, in order that the said inductance may be totally discharged during the passage of the spark or immediately afterwards, in the path between the electrode and the workpiece.

A non-negligible self-inductance is however necessary in order that the phenomenon of over-voltage may be produced. In practice, it is desirable not to reduce the value of the self-inductance below 0.1 millihenry.

It has already been pointed out that the capacitance 2 provided by the invention has the advantage of considerably diminishing the influence of the harmonics on the characteristic of the alternating source current. To indicate this, the Fig. 4 shows its action on a current 10 which contains a third harmonic whose peak coincides with that of the basic wave. As the presence of the capacitance amplifies the basic frequency and suppresses the harmonics the current assumes a shape shown by the characteristic 11; upon rectification then the current approximates a series of pulses at a frequency $2f$ which are separated by intervals during which it is practically nil. It is obvious that if the working sparks break down towards the close of each pulse the general condition at the time of spark extinction favours the assumption that the circuit for charging the storage capacitor 7 is momentarily open in regard to the source, a condition which obviously reduces the risk of arc formation. As the tension of the storage device rises in steps at each charging-current pulsation a discharge of the storage device towards the end of one of the recurrent pulses is comparatively easy to achieve.

Moreover, even if the spark strikes at the beginning of a current impulse the discharge of the capacitor 2 and/or the self-inductance 4 across the spark gap will, as was pointed out previously, lower the charging current instantly and this, too, will contribute towards obviating the arcing risk. In the case of a variable source frequency, the capacitor 2 or the additional self-inductance 3 may also be variable in order to obtain tuned conditions. Fig. 5 represents a circuit in which the capacitor 6 comprises several elements 2, 2' and 2", which may be used separately or be put in series successively. Fig. 6 shows a circuit, in which the same operation is made with the self-inductance.

It will of course be understood that modifications may be made to the forms of embodiment which have just been described, in particular by the substitution of equivalent technical means, without thereby departing from the spirit or from the scope of the present invention.

What I claim is:

1. Spark erosion apparatus for working a conductive material, comprising a source of alternating current having two terminals and a definite self inductance; a capacitor shunting said terminals of said source, the capacitance of which is approximately tuned with respect to the frequency and self-inductance of said source; a full wave rectifier network having two output terminals and two input terminals, the latter being connected separately to said two terminals of said source; capacitive storage means having two terminals connected separately to said output terminals of said rectifier network; and electrode connected to one of said output terminals and spaced from the said conductive material to be worked and defining therewith a spark-gap; and a connection between the other of said output terminals and said material.

2. Spark erosion apparatus according to claim 1 wherein the value of the capacitance of said capacitor is between $1/400$ and 1.7 times the value of the capacitance corresponding exactly to the tuned condition.

3. Spark erosion apparatus according to claim 1 wherein the value of the capacitance of said capacitor is between 0.1 and 1.2 times the value of the capacitance corresponding exactly to the tuned condition.

4. Spark erosion apparatus according to claim 1 wherein the self inductance of said source of alternating current is between 0.1 and 2.5 millihenrys.

5. Spark erosion apparatus according to claim 1 wherein said source of alternating current is an alternator of adjustable frequency.

References Cited in the file of this patent

UNITED STATES PATENTS

| | | |
|---|---|---|
| 2,804,575 | Matulaitis | Aug. 27, 1957 |
| 2,833,963 | Tognola | May 6, 1958 |